United States Patent [19]
Oltrogge

[11] 3,978,996
[45] Sept. 7, 1976

[54] TAILGATE UNLOADER

[76] Inventor: Victor Conrad Oltrogge, 6054 Queen Court, Arvada, Colo. 80004

[22] Filed: Jan. 15, 1975

[21] Appl. No.: 541,156

[52] U.S. Cl. .......................... 214/17 D; 214/83.34; 296/57 R
[51] Int. Cl.² .......................................... B60P 1/38
[58] Field of Search ............ 214/17 D, 44 B, 83.34; 296/57 R, 57 A

[56] References Cited
UNITED STATES PATENTS

| | | | |
|---|---|---|---|
| 2,488,217 | 11/1949 | McCall | 214/83.34 |
| 2,595,395 | 5/1952 | Lavelle et al. | 214/83.34 |
| 3,900,118 | 8/1975 | Kellogg | 214/84 |

*Primary Examiner*—Robert G. Sheridan
*Attorney, Agent, or Firm*—Reilly and Hancock

[57] ABSTRACT

Objects or materials are moved across the flat bed area of a storage container. A flexible belt is extended across the flat bed area and the objects or materials placed on the belt. One end of the belt is attached to a roller to which rotary power is applied so as to wind up the belt onto the roller thus skidding the load towards the rollers. An adaptable mounting permits attachment of the roller to the edge of the flat bed area so that it can be securely retained in place either when needed for conveying operations or for storage while attached but can likewise be easily removed if desired.

8 Claims, 10 Drawing Figures

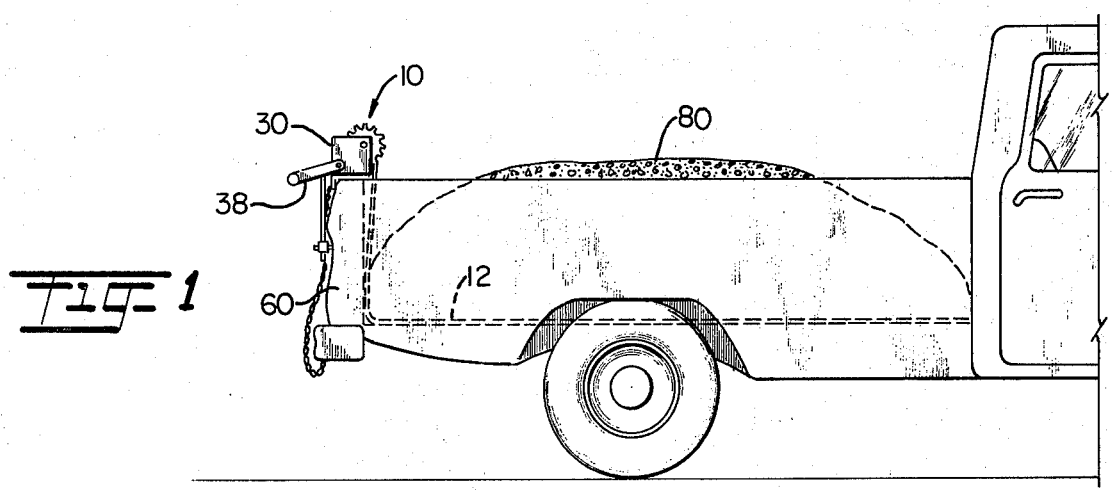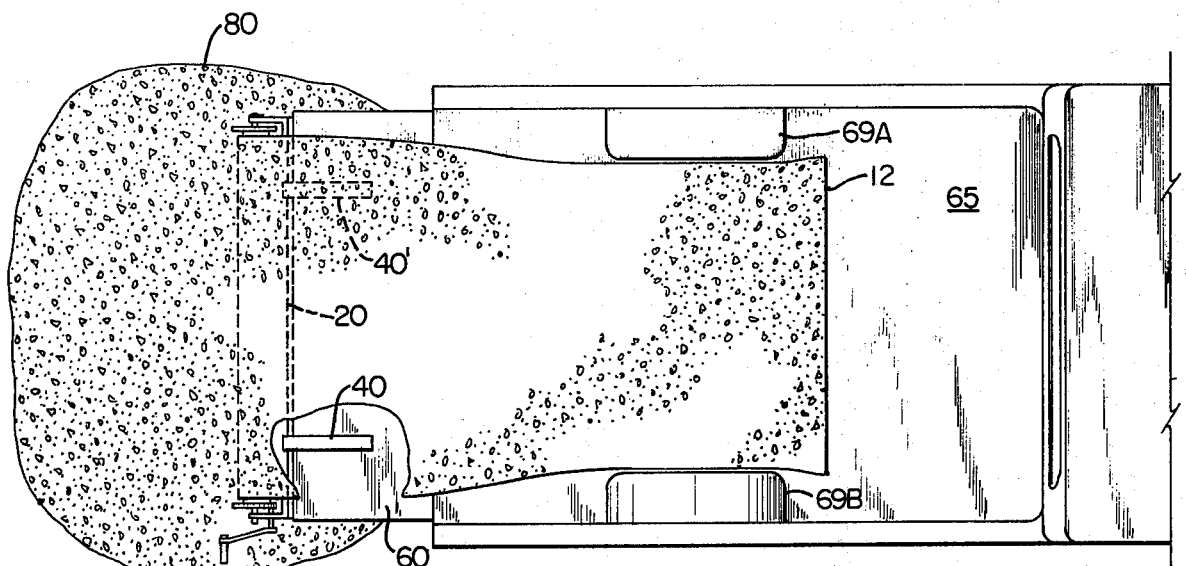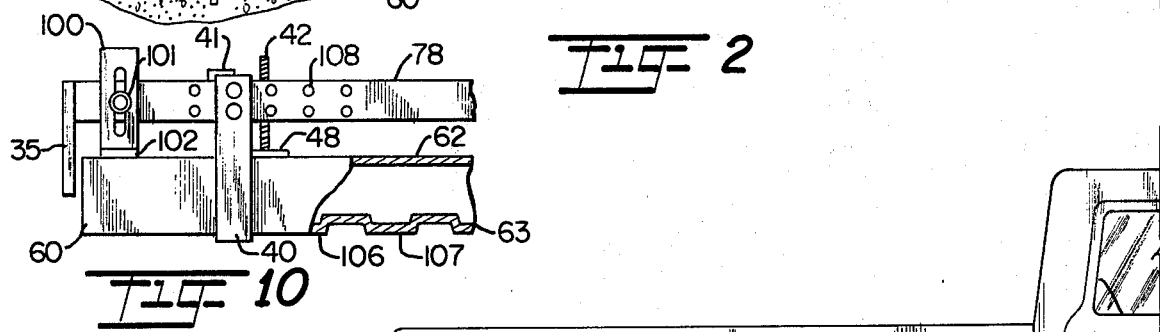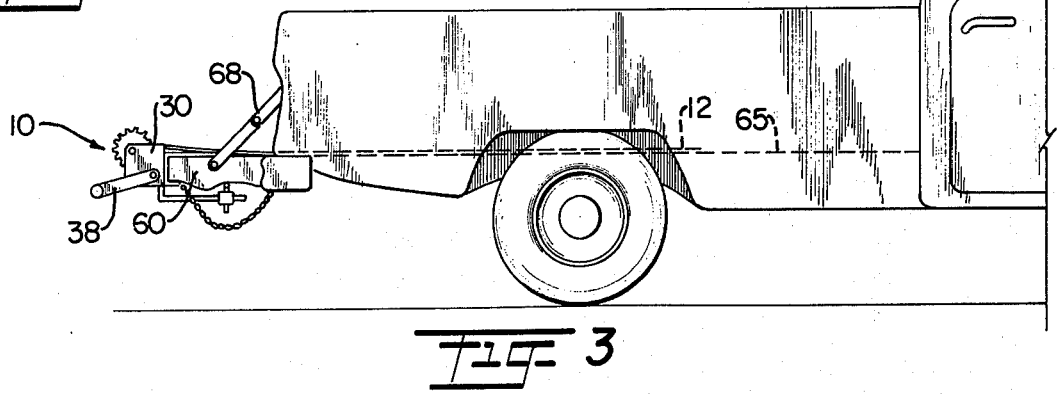

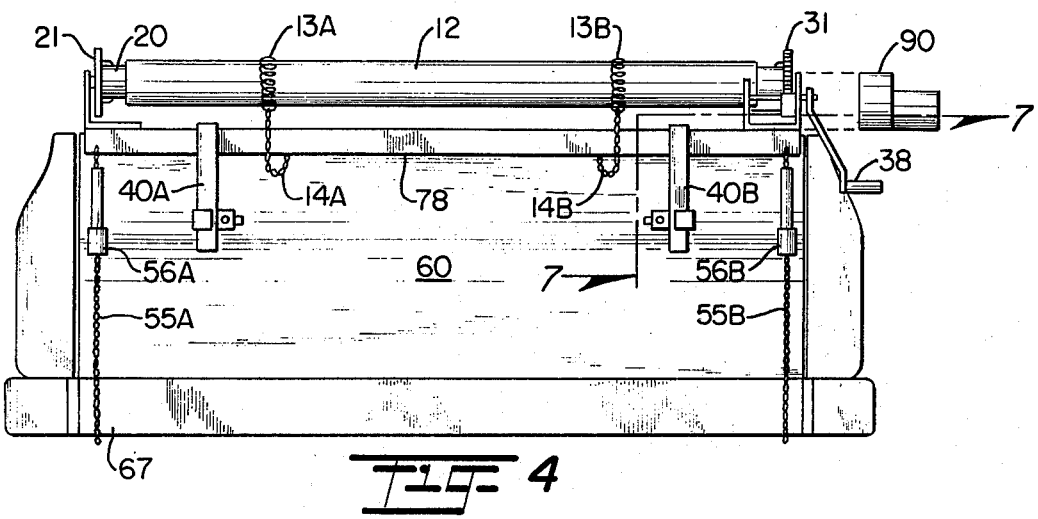
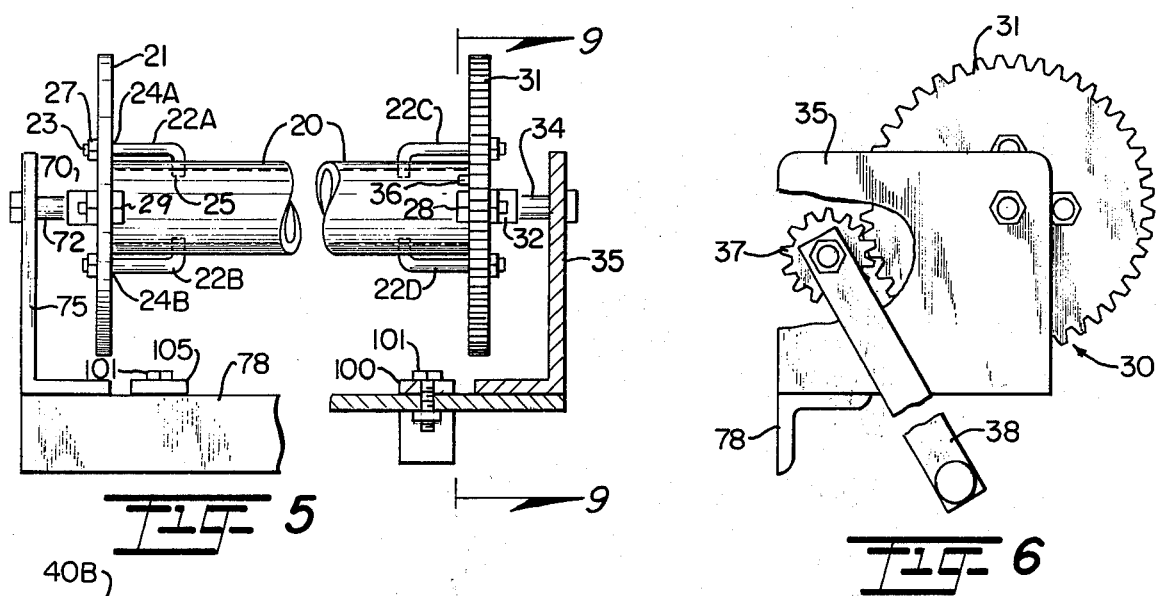
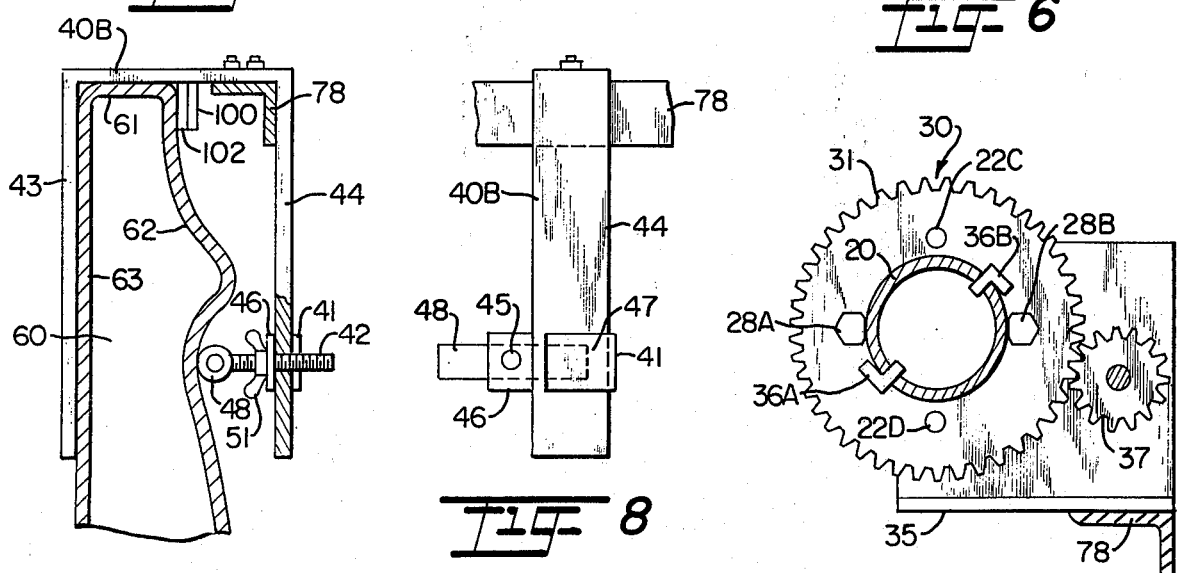

TAILGATE UNLOADER

BACKGROUND OF THE INVENTION

The present invention relates generally to apparatus and methods for conveying objects or materials from one location to another. More particularly, the present invention relates to methods and apparatus for conveying a load or cargo from a storage container. The present invention is advantageously useful for removing a wide variety of loads from an elevated platform and is especially useful for unloading heavy or awkward loads including particulate matter such as sand, gravel, grain and the like from a pickup truck box, trailer box, or any other container which is not equipped with special unloading apparatus such as a typical hoisting means to tilt the box at an inclined angle.

Many devices have been used to unload truck and trailer boxes including apparatus to lift one end of the box to allow the material to run or flow out, hopper bottom complexes, and continuous and non-continuous conveyor mechanisms.

Typical extendible endless belt conveyor systems are shown in U.S. Pat. Nos. 3,158,253 by Reilly; 3,339,650 by Carr; and 3,513,921 by Refer et al. Such conveyor systems are well suited for many purposes and often can be moved from place to place for use. However, such systems require separate loading of the material onto the conveyor system and ar prohibitively expensive for many applications. The tiltable box arrangement and the hopper type systems are likewise suitable for many unloading functions but also increase the cost of the vehicle and/or supporting container as well as rendering them useless for handling a wide variety of loads.

It has been suggested in the prior art that a roller be bolted to the end of a wagon or the like with a sheet-like belt attached to the roller. A hand crank permits winding of the belt onto the roller for skidding the load towards the roller so as to unload the wagon. However, such devices require permanent attachment relative to the storage container and are not adaptable for easy removal and attachment to a wide variety of vehicles or other storage containers.

Thus, there has been a continuing need for a relatively low-cost device which is adaptable for removing a wide variety of loads from cartons to loose particulate material from a storage area without modification to the storage container. Further, many applications demand that such a device be easily removable from the storage container for use in different locations.

SUMMARY OF INVENTION

The present invention utilizes a non-continuous conveyor, but is particularly adaptable for use in combination with unmodified storage areas or containers such as modern pickup truck boxes equipped with fold-up type tailgates.

The unloader of the present invention essentially comprises a non-continuous conveyor, a roller drum and drive mechanism, and mounting means for attaching the unloading apparatus at the edge of a storage container such as the tailgate of a pickup box. An important feature of the unloader is that it is compact and lightweight so it can be easily mounted on the tailgate of modern pick-up trucks in a manner which does not interfere with the normal use of the tailgate. Another feature is that the unloader can be mounted in place while the tailgate is in the vertical closed position so as not to interfere with loading operations but is positioned for unloading by normal opening of the tailgate to its horizontal position. Furthermore, the tailgate is neither modified nor damaged from having the present invention attached thereto.

As will be appreciated more fully from the detailed description hereinafter, the unloader of this invention is operated as follows: The non-continuous conveyor is unrolled off the roller and spread over at least a portion of the flat bed of a storage area such as the bed of the pickup box and the load is deposited on the conveyor; to unload, the tailgate on which the roller and drive mechanism is mounted is opened to the horizontal position, and the load is unloaded by rolling the conveyor back onto the roller by cranking the drive mechanism, thereby drawing the load to the end of the box, over the tailgate, and depositing it on a lower level or at least positioning it for easier handling.

Accordingly, it is an object of the present invention to provide a novel and improved unloading device and method for pickup trucks, trailers and the like which can be readily mounted on the tailgate of the pickup truck in a manner that will not interfere with the normal use of the tailgate.

It is another object of the present invention to provide a method and apparatus for rapidly unloading particulate matter from a pickup truck box with a minimum of manual labor.

Still another object of this invention is to provide a universal mounting apparatus for attaching a roller and belt conveyor to an edge of any of a wide variety of storage containers.

It is also an object of the present invention to provide a simple, compact and lightweight unloading device which can be readily mounted on and removed from any modern pickup truck requiring no alterations, deformation or damage to the pickup truck body.

A still further object of this invention is to provide a method and apparatus for conveying objects or materials from a storage container.

Yet another object of this invention is to provide a method and apparatus for moving objects or materials across a storage area.

Another object of this invention is to provide an apparatus for moving a cargo from a storage container wherein the apparatus is easily mounted to the storage container without requiring modification of the storage container.

Other objects, advantages, features and capabilities of the present invention will become more apparent in light of the following description of a preferred embodiment taken in conjunction with the accompanying drawings.

BRIEF DESCRIPTION OF THE DRAWINGS

FIG. 1 is a side elevation view of a pickup truck which is equipped with the present invention and which is shown loaded with particulate matter;

FIG. 2 is a plan view of the pickup truck which is equipped with a tailgate unloader in accordance with the present invention and which is shown in partially unloaded state with a portion of the particulate matter and non-continuous conveyor being broken away to reveal a portion of the clamp means;

FIG. 3 is a side elevation view of the pickup truck which is equipped with a tailgate unloader of this invention and which is shown in partially unloaded state but with the load omitted for clarity;

FIG. 4 is an enlarged rear elevation view of the pickup truck equipped with the tailgate unloader shown with the conveyor rolled up in non-use position;

FIG. 5 is an enlarged rear elevation view of the tailgate unloader with the rear portion of the winch apparatus being broken away to reveal the mounting means for the conveyor drum;

FIG. 6 is an enlarged side elevation view of the tailgate unloader showing the winch apparatus with a portion of the mounting plate being broken away to reveal the gear-drive mechanism;

FIG. 7 is an enlarged transverse sectional view taken substantially along the plane 7—7 of FIG. 4 showing the clamp means for mounting the tailgate unloader on the tailgate of the pickup truck;

FIG. 8 is an enlarged rear elevation view of the same clamp means as shown in FIG. 7;

FIG. 9 is a transverse sectional view showing the drive means taken substantially along the plane 9—9 of FIG. 5; and FIG. 10 is a top partially sectioned view of one end of the mounting apparatus.

DESCRIPTION OF THE PREFERRED EMBODIMENT

A pickup truck equipped with a tailgate unloader 10 formed in accordance with the present invention and carrying a load 80 of particulate matter such as sand, gravel, grain and the like is shown in FIG. 1. The tailgate unloader 10, which is mounted on top of the tailgate 60 of the truck, essentially comprises a non-continuous conveyor 12, a drum roller 20, a winch assembly 30, and a universal mounting configuration which is readily adaptable to any surface as will be described in detail below. It will be appreciated from the description that follows that the tailgate unloader can be used to unload the particulate matter from the truck with a minimum of manual labor.

The general construction of the conveying apparatus for the tailgate unloader 10 is best seen in FIGS. 4, 5, 6 and 9. A roller 20, being of a length approximately equal to the top edge 61 of the tailgate 60 of the pickup truck, is mounted between an idler guide wheel 21 on one end and a slave gear 31 on the other end by means of hooked bolts 22A–22D. The threaded ends such as 23 of hooked bolts 22 are inserted through diametrically opposing holes 24A and 24B in guide wheel 21, and hooked ends such as 25 are inserted into holes in roller 20. Nuts such as 27 are then screwed onto the threaded ends (23) of hook bolts 22 thereby snugly holding roller 20 against guide wheel 21 and gear 31. Guide wheel 21 also has another set of diametrically opposing holes through which thrust bolts 29 are inserted. The spacing of the holes for bolts 29 is such that the roller 20 just slips between the heads of bolts 29 thereby being in a position to transfer lateral thrust on the roller 20 to guide wheel 21 through thrust bolts 29, as will be described more thoroughly below.

At the opposite end of roller 20, the threaded ends of hooked bolts 22C and 22D are inserted through diametrically opposing holes in slave gear 31, and the hooked ends thereof are inserted into holes in roller 20. Nuts are then screwed onto the threaded ends thereby snugly holding roller 20 against slave gear 31. Slave gear 31 also has another set of diametrically opposing holes through which thrust bolts 28A and 28B are inserted. The spacing of the holes for bolts 28 is such that the roller 20 just slips between the heads of bolts 28, as shown in FIG. 9, thereby being in a position to transfer lateral thrust on the roller 20 to slave gear 31 through thrust bolts, as will be described below. Two L-shaped keys 36A and 36B are rigidly attached in diametrically opposed positions on the slave gear 31, as shown in FIG. 9. These keys are received into corresponding key slots in roller 20 when roller 20 is slipped between thrust bolts 28 and drawn snugly against slave gear 31 by hooked bolts as described above. It will be readily apparent to those having normal skill in the art that L-keys 36 can effect transmission of the lateral and rotary thrust between roller 20 and gear 31 by themselves so that thrust bolts 28 could be omitted if desired.

The guide wheel 21 has a hub 70 with suitable inside bearing surfaced hole. An axle shaft 72, which is rigidly attached to an idler bracket 75, is inserted through the bearing surfaced hole of hub 70 to support the idler wheel 21 and left side of roller 20. The idler bracket is rigidly attached to the horizontal surface of angle-shaped cross beam 78.

The slave gear 31 also has a hub 32 with suitable inside bearing surfaced hole. An axle shaft 34 which is rigidly attached to housing plate 35 of winch assembly 30, is inserted through the bearing surfaced hole of hub 32 to support the slave gear 31 and right side of roller 20. The housing plate 35 is also rigidly attached to the horizontal surface of cross beam 78.

The winch assembly 30 comprises a housing 35, axle-mounted master gear 37, axle-mounted slave gear 31, and crank 38. Note that gear 37 preferably is mounted between the upright arms of a U-shaped arrangement of housing 35 although the inner upright arm has been omitted from the drawings for clarity. When the crank 38 is manually operated, it turns the master gear 37. The cogs in master gear 37 mesh with the cogs in slave gear 31 thereby causing slave gear 31 to turn. The master gear 37 is proportionately sized smaller in diameter than the slave gear 31 thereby providing a mechanical advantage to the person operating the crank 38, as would be readily understood by those skilled in the art. Although only two speed reduction gears 31 and 37 have been shown by way of illustration, it will be readily recognized that additional intermediary speed reduction gears can be included between 31 and 37 depending primarily upon the anticipated maximum loads which the device is expected to handle. The roller 20, which is snugly attached to the slave gear 31, as described above, is turned by the slave gear 31, the torque being transferred from the slave gear 31 to roller 20 through the keys 36. Note that any means of transferring rotary power from gear 31 to roller 20 can be used instead of keys 36 such as stubs on the end of roller 20 and matching slots in gear 31, stubs on the side of gear 31 and matching holes in roller 20, or even welding of roller 20 to gear 31. As will be more fully described below, the turning roller 20 drags non-continuous conveyor 12 across the bed 65 of the pickup truck box. This conveyor operation results in a lateral thrust on the roller 20. This lateral thrust is transferred from the roller 20 to guide wheel 21 and to slave gear 31 through thrust bolts 28 and 29 as well as through L-keys 36 or other torque transmitting means.

The non-continuous conveyor 12 is preferably formed of a tough, durable and flexible fabric such as canvas material. It is sized somewhat longer than the combined lengths of the bed 65 and tailgate 60 of the box of the pickup truck, and the width is slightly less than the length of roller 20. The rear end of conveyor 12 is connected to roller 20 so that when roller 20 is turned, conveyor 12 is thereby rolled up on roller 20. FIG. 4 shows conveyor 12 completely rolled up on roller 20 with retainer springs 13A and 13B in place to retain the conveyor 12 in the rolled up position while it is not in use. Retainer rings 13 can be provided by hooked wrap-around springs as shown or can be formed of a thin band of spring steel, the ends of which can be manually spread apart when placing the retainer rings 13 over the rolled up conveyor 12 and when being removed from that position. The retainer rings 13 are flexibly attached to the cross beam 78 by chains 14A and 14B to prevent them from becoming lost when removed from the rolled-up conveyor 12 while the conveyor 12 is being used as will be described later.

The means for mounting the tailgate unloader 10 to a pickup truck can best be seen by referring to FIGS. 4, 7, 8 and 10. With the tailgate 60 preferably in closed position, the tailgate unloader 10 is placed on the top surface 61 of tailgate 60. More specifically, the horizontal leg of U-shaped brackets 40 which are attached to angle-shaped cross beam 78 is placed on the top surface 61 with one vertical leg 43 protruding downward and being in contact with the inner surface 63 of tailgate 60. The two spaced clamps 40A and 40B, which are rigidly attached over the horizontal leg of cross beam 78, slip down over the top of the tailgate 60 as will be described presently in more detail. FIGS. 7 and 8 are enlarged views of clamp 40B and will be described in detail, but it should be noted that the description will be equally applicable to clamp 40A with the exception that the slider similar to 41 is oppositely oriented.

The clamp 40 is generally constructed of a strap-iron formed into a U-shaped bracket. The horizontal member portion of the clamp 40 is attached to the horizontal leg of cross beam 78, the front vertical member 43 slips down over the tailgate 60 in contact with the front or inner surface 63 of tailgate 60, and the rear vertical member 44 slips down over the tailgate 60 slightly to the rear of the rear surface 62 of tailgate 60.. A slider 41 is positioned on the rear member 44 of clamp 40. The slider 40 has a hole 45 in the inside guide 46 through which a T-shaped tightener bolt 42 is inserted, the hole 45 being drilled in such a position that the tightener bolt 42 passes through the inside guide 46 of slider 41 and alongside but, for ease of attachment, preferably not through rear member 44 of clamp 40. The front guide 47 of slider 41 is shorter than the rear guide 46, so it does not interfere with the position of tightener bolt 42. A pliable tube 48 formed of plastic, rubber or the like is slipped over each end of tightener bolt 42. The shaft of tightener bolt 42 is threaded so that, when the clamp 40 is in position on tailgate 60, a wing-nut 51 on tightener bolt 42 can be screwed against the inside guide 46 of slider 41, thereby forcing the end 48 of tightener bolt 42 snugly against the rear surface 62 of tailgate 60. In this manner, the clamp 40 tightly fastens the tailgate unloader 10 to the tailgate 60 of pickup truck, the pliable tube 48 on tightener bolt 42 serving to protect the rear surface 62 of tailgate 60 from being scratched or otherwise damaged. Prior to tightening the clamp 40 as just described, the slider 41 can be adjustably slid up or down on rear member 44 of clamp 40 to any position which is suitable for effective clamping on any particular model of pickup truck or other suitable framework.

Chains 55A and 55B with conventional chain tighteners 56A and 56B are also provided to assist in holding the tailgate unloader 10 down tightly on the tailgate 60 (see FIG. 4), particularly when the tailgate unloader is not being used for unloading purposes and the truck is traveling on rough roads. One end of chain 55 is connected to the end of cross beam 78 and the other end is releasably connected to bumper 67 of the pickup truck, and chain tightener 56 is attached along the span of chain 55 for applying tension to the chain 55 after the tailgate unloader 10 is clamped in position on tailgate 60 as described above. Chains 55 serve an additional function of holding tailgate 60 in the open position during unloading in the event tailgate 60 does not have any locking means for holding it down once opened.

As shown in this exemplary preferred embodiment, angle beam 78 is preferably attachable to tailgate 60 in a somewhat offset relation so that the axis of roller 20 can be generally aligned with the plane of the tailgate inner surface 63. Accordingly, it is desirable to include some means of retaining beam 78 in a relatively fixed position with respect to the top of tailgate 60. Although not required by an unloading operation, such and additional mounting means will help prevent impact between beam 78 and tailgate 60 particularly when the tailgate is closed and the vehicle is moving. This additional mounting means can be provided by an additional slider assembly 41 on each clamp 40 located near the top of the tailgate. Another supplementary attaching means is shown in FIG. 10 wherein slotted L-shaped member 100 is slidably attached near the end of beam 78 by bolt assembly 101. The downward face of member 100 has a resilient pad 102 bonded thereto to protect the surface of tailgate 60 while retaining beam 78 in place. Note that member 100 and its counterpart member 105 on the other end (FIG. 5) are attached approximately in alignment with the planes of gear 31 and guide 21 thereby reducing the possibility of a twisting motion being imparted to beam 78 when the device is being used for unloading. Tailgates of typical pickup trucks and the like frequently are formed with a series of raised transverse ribs such as 106 and 107 as can be seen in FIG. 10. Thus a series of mounting holes 108 can be included along beam 78 to accommodate location of clamps 40 so that inner arms 43 thereof can be aligned with these ribs.

After the tailgate unloader 10 is securely mounted on tailgate 60 as described above, it can be used to conveniently unload a pickup truck as will be described herein by referring primarily to FIGS. 1, 2, 3 and 4. Prior to putting the load 80 in the box of the truck, the conveyor 12 is placed in loading position by removing retainer means 13 from the rolled up conveyor 12, (see FIG. 4). The conveyor 12 is then unrolled from roller 20 and spread over the length of bed 65 of the pickup truck. Since the conveyor 12 is formed of a flexible fabric, it can be laid around the wheel wells 69A and 69B if they are formed so as to protrude into bed 65 as shown. The load 80 shown as being comprised of particulate matter is then loaded on top of the extended conveyor 12 as shown in FIG. 1.

For unloading the load 80, the tailgate 60 is preferably opened and retained in horizontal position by the conventional hinged retaining arms 68 or other means provided by the truck manufacturer for that purpose, as shown in FIG. 3. If the tailgate does not include some means for locking it in the open position, it may be necessary to tighten chain 55 via tighteners 56. This prevents tailgate 60 from unintentionally being pulled closed during unloading of heavy cargoes. The tailgate unloader is then operated by manually turning crank 38 of winch 30 which, as described above, causes the roller 20 to turn, thereby drawing the conveyor 12 toward the rear of the truck, as the conveyor 12 is rolled up onto the roller 20. As the conveyor 12 is so drawn to the rear of the truck, it carries the load 80 rearward over the bed 65 and tailgate 60, and ultimately the load 80 can be deposited on the ground as shown in FIG. 2.

When the entire load 80 is deposited on the ground and the conveyor 12 is completely rolled back onto roller 20, the retainer means 13 can be replaced around the rolled-up conveyor 12, the tailgate 60 can be returned to closed position, and the pickup truck will be ready for normal use.

To remove the tailgate unloader 10 from the pickup truck it is only necessary to loosen the chain tighteners 56, detach the lower ends of chains 55 from the bumper 67, loosen tightener bolts 42 by screwing wing nuts 51 away from slider 41, loosen the bolts for L-member 100 and 105, [if necessary] and lift the tailgate unloader 10 off the tailgate 60. To replace the tailgate unloader on the pickup truck, this procedure is performed in reverse order.

It can be appreciated that, even though the tailgate unloader 10 is preferably operated with the tailgate 60 in horizontal open position as described above, it can also be operated with the tailgate 60 in vertical closed position or in any position between the horizontal and the vertical. In addition, a power unit 90, such as an electric motor, hydraulic motor, or the like, can be provided as an alternative to the manually operated crank for winch 30 for driving the roller 20 and operating the conveyor 12, as shown in FIG. 4. It can also be appreciated that the tailgate unloader can be used to transfer any objects such as boxes or other articles towards the rear of the box of a pickup truck where they can either be deposited on the ground or conveniently picked up from the tailgate area alleviating the need to manually transfer such items to the rear of the container for unloading. The present invention makes available a relatively low-cost conveyor system well suited for handling a wide variety of loads from within a container by means of a device which can be easily attached to or removed from the container without requiring any modification to the container.

Although the preferred embodiment of the present invention has been described with a certain degree of particularity, it is understood that the present disclosure has been made by way of example and that various modifications, additions and changes may be made by those having normal skill in the art without departing from the spirit of this invention.

What is claimed is:

1. Apparatus for conveying objects or materials from a storage location which has a flat bed area and side walls enclosing the flat bed area except at one open or openable edge with the flat bed area having first and second spaced parallel surfaces along the edge comprising:

a beam having a length substantially the same as said open edge and having spaced side plates extending outwardly therefrom in perpendicular offset relation to the length of said beam, a roller means rotatably attached between said side plates, clamping means surroundingly engageable with said first and second surfaces for releasably attaching said beam to said open edge so that the axis of said roller is substantially parallel to said open edge of the flat bed area, a flat flexible belt atttached to said roller means and having a length sufficient for extending from said roller means into at least a portion of the flat bed area, a source of rotary power, and transmission means for coupling said rotary power source to said roller means, whereby any object or material placed upon said flexible belt when extended into the flat bed area can be moved towards said roller means by actuating said rotary power source and thus rolling said belt upon said roller means.

2. Apparatus in accordance with claim 1 for use with a storage location which has a panel hinged at one edge with a surface thereof completing the flat bed area when in a first position and cooperating with the side walls to complete the enclosure of the storage location when in a second position, said clamping means further including at least two arms extending from said beam on the side opposite said side plates for receiving the edge of the panel opposite the hinged edge, said clamping means further including means for releasably clamping said arms around said panel, and said belt being of sufficient length to extend from said roller means across the width of the panel and the flat bed area when the panel is in either the first or the second position.

3. Apparatus in accordance with claim 2 wherein said roller means includes a tubular member having a flange plate at either end thereof extending outwardly from the exterior surface of said tubular member for providing a guide for said belt when it is being rolled onto said tubular member, said flange plates being rotatably attached to a respective said side plate, and said transmission means including means for cooperating with one of said flange plates for coupling rotary motion to said tubular member.

4. Apparatus in accordance with claim 3 wherein said transmission means includes a plurality of gear teeth formed on the periphery of one of said flange plates, and a gear element rotatably attached to the said side plate at the end said one of said flange plates is rotatably attached, said gear element having teeth thereon for meshing with the teeth of said one of said flange plates for imparting less rotary motion to said one of said flange plates than is being produced by said rotary power source.

5. Apparatus in accordance with claim 1 wherein said clamping means includes at least two arms extending from said beam on the side opposite said side plates for receiving said open edge therebetween, one of said arms being adapted to lie flat against said flat bed area first surface and the other said arm including means releasably gripping said flat bed area second surface for establishing a retention force for said arms relative to said surfaces.

6. Apparatus in accordance with claim 5 wherein said releasably gripping means is a shaft threaded through said other arm for movement perpendicular to said second surface.

7. Apparatus in accordance with claim 6 which includes at least one spacer member adjustably attached to said beam for abutting said open edge when said arms are attached to said flat bed area surfaces thereby positioning said beam in parallel but spaced relation with said open edge.

8. Apparatus in accordance with claim 7 wherein the end of said shaft which engages said second surface and the end of said spacer member which abuts said open edge each have resilient pads attached thereto for interfacing the associated said shaft and said member with said flat bed area.

* * * * *